US009251856B1

(12) United States Patent
Wheelock et al.

(10) Patent No.: US 9,251,856 B1
(45) Date of Patent: Feb. 2, 2016

(54) READ FAILOVER METHOD AND APPARATUS FOR A DATA STORAGE SYSTEM

(71) Applicant: Western Digital Technologies, Inc., Irvine, CA (US)

(72) Inventors: David W. Wheelock, Longmont, CO (US); Shafa Dahandeh, Laguna Niguel, CA (US); Anantha Raman Krishnan, Irvine, CA (US); Aravind Raghunathan, Irvine, CA (US); Kent D. Anderson, Broomfield, CO (US)

(73) Assignee: Western Digial Technologies, Inc., Irvine, CA (US)

( * ) Notice: Subject to any disclaimer, the term of this patent is extended or adjusted under 35 U.S.C. 154(b) by 0 days.

(21) Appl. No.: 14/664,730

(22) Filed: Mar. 20, 2015

Related U.S. Application Data

(60) Provisional application No. 62/005,796, filed on May 30, 2014.

(51) Int. Cl.
*G11B 27/36* (2006.01)
*G11B 5/09* (2006.01)
*G11B 20/10* (2006.01)
*G11B 20/18* (2006.01)

(52) U.S. Cl.
CPC .......... *G11B 27/36* (2013.01); *G11B 20/10037* (2013.01); *G11B 20/18* (2013.01)

(58) Field of Classification Search
CPC .... G11B 27/36; G11B 5/012; G11B 2220/20; G11B 2220/90; G11B 5/00; G11B 5/02; G11B 5/09
USPC .............................. 360/39, 31, 25, 53, 55, 75
See application file for complete search history.

(56) References Cited

U.S. PATENT DOCUMENTS

| | | | |
|---|---|---|---|
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,175,893 | B1 | 1/2001 | D'Souza et al. |
| 6,178,056 | B1 | 1/2001 | Cloke et al. |
| 6,191,909 | B1 | 2/2001 | Cloke et al. |
| 6,195,218 | B1 | 2/2001 | Guttmann et al. |
| 6,205,494 | B1 | 3/2001 | Williams |

(Continued)

OTHER PUBLICATIONS

David W. Wheelock, et al., U.S. Appl. No. 14/682,048, filed Apr. 8, 2015, 32 pages.

*Primary Examiner* — Nabil Hindi

(57) ABSTRACT

A reader failover system and method are described for a data storage system. At least two reader systems, including a first reader element and a second reader element, situated on the same head, are employed to read a magnetic storage medium. In an aspect, the head is a two-dimensional magnetic recording (TDMR) head. Control circuitry detects when the first reader system provides less than a predetermined performance or fails, and thereafter causes the second reader system, but not the first reader system, to read the magnetic storage medium. In an aspect, a buffer stores a first reader element signal until the control circuitry detects whether or not the first reader element provides less than a predetermined performance or fails. In an aspect, when a reader element fails, data recovery is performed, and all of, or a majority of, the media continues to be readable, improving the data storage system robustness.

22 Claims, 6 Drawing Sheets

(56) References Cited

U.S. PATENT DOCUMENTS 6,208,477 B1 3/2001 Cloke et al.
6,223,303 B1 4/2001 Billings et al.
6,230,233 B1 5/2001 Lofgren et al.
6,246,346 B1 6/2001 Cloke et al.
6,249,393 B1 6/2001 Billings et al.
6,256,695 B1 7/2001 Williams
6,262,857 B1 7/2001 Hull et al.
6,263,459 B1 7/2001 Schibilla
6,272,694 B1 8/2001 Weaver et al.
6,278,568 B1 8/2001 Cloke et al.
6,279,089 B1 8/2001 Schibilla et al.
6,289,484 B1 9/2001 Rothberg et al.
6,292,912 B1 9/2001 Cloke et al.
6,310,740 B1 10/2001 Dunbar et al.
6,317,850 B1 11/2001 Rothberg
6,327,106 B1 12/2001 Rothberg
6,337,778 B1 1/2002 Gagne
6,369,969 B1 4/2002 Christiansen et al.
6,373,649 B1 4/2002 Walker et al.
6,384,999 B1 5/2002 Schibilla
6,388,833 B1 5/2002 Golowka et al.
6,405,342 B1 6/2002 Lee
6,408,357 B1 6/2002 Hanmann et al.
6,408,406 B1 6/2002 Parris
6,411,452 B1 6/2002 Cloke
6,411,458 B1 6/2002 Billings et al.
6,412,083 B1 6/2002 Rothberg et al.
6,415,349 B1 7/2002 Hull et al.
6,425,128 B1 7/2002 Krapf et al.
6,441,981 B1 8/2002 Cloke et al.
6,442,328 B1 8/2002 Elliott et al.
6,445,524 B1 9/2002 Nazarian et al.
6,446,156 B1 9/2002 Chia et al.
6,449,767 B1 9/2002 Krapf et al.
6,453,115 B1 9/2002 Boyle
6,470,420 B1 10/2002 Hospodor
6,480,020 B1 11/2002 Jung et al.
6,480,349 B1 11/2002 Kim et al.
6,480,932 B1 11/2002 Vallis et al.
6,483,986 B1 11/2002 Krapf
6,487,032 B1 11/2002 Cloke et al.
6,490,635 B1 12/2002 Holmes
6,493,173 B1 12/2002 Kim et al.
6,499,083 B1 12/2002 Hamlin
6,519,104 B1 2/2003 Cloke et al.
6,525,892 B1 2/2003 Dunbar et al.
6,545,830 B1 4/2003 Briggs et al.
6,546,489 B1 4/2003 Frank, Jr. et al.
6,550,021 B1 4/2003 Dalphy et al.
6,552,880 B1 4/2003 Dunbar et al.
6,553,457 B1 4/2003 Wilkins et al.
6,578,106 B1 6/2003 Price
6,580,573 B1 6/2003 Hull et al.
6,594,183 B1 7/2003 Lofgren et al.
6,600,620 B1 7/2003 Krounbi et al.
6,601,137 B1 7/2003 Castro et al.
6,603,622 B1 8/2003 Christiansen et al.
6,603,625 B1 8/2003 Hospodor et al.
6,604,220 B1 8/2003 Lee
6,606,682 B1 8/2003 Dang et al.
6,606,714 B1 8/2003 Thelin
6,606,717 B1 8/2003 Yu et al.
6,611,393 B1 8/2003 Nguyen et al.
6,615,312 B1 9/2003 Hamlin et al.
6,633,442 B2 10/2003 Quak et al.
6,639,748 B1 10/2003 Christiansen et al.
6,647,481 B1 11/2003 Luu et al.
6,654,193 B1 11/2003 Thelin
6,657,810 B1 12/2003 Kupferman
6,661,591 B1 12/2003 Rothberg
6,665,772 B1 12/2003 Hamlin
6,687,073 B1 2/2004 Kupferman
6,687,078 B1 2/2004 Kim
6,687,850 B1 2/2004 Rothberg
6,690,523 B1 2/2004 Nguyen et al.
6,690,882 B1 2/2004 Hanmann et al.
6,691,198 B1 2/2004 Hamlin
6,691,213 B1 2/2004 Luu et al.
6,691,255 B1 2/2004 Rothberg et al.
6,693,760 B1 2/2004 Krounbi et al.
6,694,477 B1 2/2004 Lee
6,697,914 B1 2/2004 Hospodor et al.
6,704,153 B1 3/2004 Rothberg et al.
6,708,251 B1 3/2004 Boyle et al.
6,710,951 B1 3/2004 Cloke
6,711,628 B1 3/2004 Thelin
6,711,635 B1 3/2004 Wang
6,711,660 B1 3/2004 Milne et al.
6,715,044 B2 3/2004 Lofgren et al.
6,724,982 B1 4/2004 Hamlin
6,725,329 B1 4/2004 Ng et al.
6,735,650 B1 5/2004 Rothberg
6,735,693 B1 5/2004 Hamlin
6,744,772 B1 6/2004 Eneboe et al.
6,745,283 B1 6/2004 Dang
6,751,036 B2 6/2004 Quak et al.
6,751,402 B1 6/2004 Elliott et al.
6,757,481 B1 6/2004 Nazarian et al.
6,772,281 B2 8/2004 Hamlin
6,781,826 B1 8/2004 Goldstone et al.
6,782,449 B1 8/2004 Codilian et al.
6,791,779 B1 9/2004 Singh et al.
6,792,486 B1 9/2004 Hanan et al.
6,795,261 B2 9/2004 Chia et al.
6,799,274 B1 9/2004 Hamlin
6,811,427 B2 11/2004 Garrett et al.
6,826,003 B1 11/2004 Subrahmanyam
6,826,614 B1 11/2004 Hanmann et al.
6,832,041 B1 12/2004 Boyle
6,832,929 B2 12/2004 Garrett et al.
6,845,405 B1 1/2005 Thelin
6,845,427 B1 1/2005 Atai-Azimi
6,850,443 B2 2/2005 Lofgren et al.
6,851,055 B1 2/2005 Boyle et al.
6,851,063 B1 2/2005 Boyle et al.
6,853,731 B1 2/2005 Boyle et al.
6,854,022 B1 2/2005 Thelin
6,862,660 B1 3/2005 Wilkins et al.
6,880,043 B1 4/2005 Castro et al.
6,882,486 B1 4/2005 Kupferman
6,884,085 B1 4/2005 Goldstone
6,888,831 B1 5/2005 Hospodor et al.
6,892,217 B1 5/2005 Hanmann et al.
6,892,249 B1 5/2005 Codilian et al.
6,892,313 B1 5/2005 Codilian et al.
6,895,455 B1 5/2005 Rothberg
6,895,500 B1 5/2005 Rothberg
6,898,730 B1 5/2005 Hanan
6,910,099 B1 6/2005 Wang et al.
6,928,470 B1 8/2005 Hamlin
6,931,439 B1 8/2005 Hanmann et al.
6,934,104 B1 8/2005 Kupferman
6,934,713 B2 8/2005 Schwartz et al.
6,940,873 B2 9/2005 Boyle et al.
6,943,978 B1 9/2005 Lee
6,948,165 B1 9/2005 Luu et al.
6,950,267 B1 9/2005 Liu et al.
6,954,733 B1 10/2005 Ellis et al.
6,961,814 B1 11/2005 Thelin et al.
6,965,489 B1 11/2005 Lee et al.
6,965,563 B1 11/2005 Hospodor et al.
6,965,966 B1 11/2005 Rothberg et al.
6,967,799 B1 11/2005 Lee
6,968,422 B1 11/2005 Codilian et al.
6,968,450 B1 11/2005 Rothberg et al.
6,973,495 B1 12/2005 Milne et al.
6,973,570 B1 12/2005 Hamlin
6,976,190 B1 12/2005 Goldstone
6,983,316 B1 1/2006 Milne et al.
6,986,007 B1 1/2006 Procyk et al.
6,986,154 B1 1/2006 Price et al.
6,995,933 B1 2/2006 Codilian et al.
6,996,501 B1 2/2006 Rothberg
6,996,669 B1 2/2006 Dang et al.

(56) References Cited

U.S. PATENT DOCUMENTS 7,002,926 B1 2/2006 Eneboe et al.
7,003,674 B1 2/2006 Hamlin
7,006,316 B1 2/2006 Sargenti, Jr. et al.
7,009,820 B1 3/2006 Hogg
7,012,771 B1 3/2006 Asgari et al.
7,023,639 B1 4/2006 Kupferman
7,024,491 B1 4/2006 Hanmann et al.
7,024,549 B1 4/2006 Luu et al.
7,024,614 B1 4/2006 Thelin et al.
7,027,716 B1 4/2006 Boyle et al.
7,028,174 B1 4/2006 Atai-Azimi et al.
7,031,902 B1 4/2006 Catiller
7,046,465 B1 5/2006 Kupferman
7,046,471 B2 5/2006 Meyer et al.
7,046,488 B1 5/2006 Hogg
7,050,252 B1 5/2006 Vallis
7,054,937 B1 5/2006 Milne et al.
7,055,000 B1 5/2006 Severtson
7,055,167 B1 5/2006 Masters
7,057,836 B1 6/2006 Kupferman
7,062,398 B1 6/2006 Rothberg
7,075,746 B1 7/2006 Kupferman
7,076,604 B1 7/2006 Thelin
7,082,494 B1 7/2006 Thelin et al.
7,088,538 B1 8/2006 Codilian et al.
7,088,545 B1 8/2006 Singh et al.
7,092,186 B1 8/2006 Hogg
7,095,577 B1 8/2006 Codilian et al.
7,099,095 B1 8/2006 Subrahmanyam et al.
7,106,537 B1 9/2006 Bennett
7,106,947 B2 9/2006 Boyle et al.
7,110,202 B1 9/2006 Vasquez
7,111,116 B1 9/2006 Boyle et al.
7,114,029 B1 9/2006 Thelin
7,120,737 B1 10/2006 Thelin
7,120,806 B1 10/2006 Codilian et al.
7,126,776 B1 10/2006 Warren, Jr. et al.
7,129,763 B1 10/2006 Bennett et al.
7,133,600 B1 11/2006 Boyle
7,136,244 B1 11/2006 Rothberg
7,146,094 B1 12/2006 Boyle
7,149,046 B1 12/2006 Coker et al.
7,150,036 B1 12/2006 Milne et al.
7,155,616 B1 12/2006 Hamlin
7,171,108 B1 1/2007 Masters et al.
7,171,110 B1 1/2007 Wilshire
7,194,576 B1 3/2007 Boyle
7,200,698 B1 4/2007 Rothberg
7,205,805 B1 4/2007 Bennett
7,206,497 B1 4/2007 Boyle et al.
7,215,496 B1 5/2007 Kupferman et al.
7,215,771 B1 5/2007 Hamlin
7,237,054 B1 6/2007 Cain et al.
7,240,161 B1 7/2007 Boyle
7,249,365 B1 7/2007 Price et al.
7,263,709 B1 8/2007 Krapf
7,274,639 B1 9/2007 Codilian et al.
7,274,659 B2 9/2007 Hospodor
7,275,116 B1 9/2007 Hanmann et al.
7,280,302 B1 10/2007 Masiewicz
7,292,774 B1 11/2007 Masters et al.
7,292,775 B1 11/2007 Boyle et al.
7,296,284 B1 11/2007 Price et al.
7,302,501 B1 11/2007 Cain et al.
7,302,579 B1 11/2007 Cain et al.
7,318,088 B1 1/2008 Mann
7,319,806 B1 1/2008 Willner et al.
7,324,860 B2 1/2008 Dyer
7,325,244 B2 1/2008 Boyle et al.
7,330,323 B1 2/2008 Singh et al.
7,346,790 B1 3/2008 Klein
7,366,641 B1 4/2008 Masiewicz et al.
7,369,340 B1 5/2008 Dang et al.
7,369,343 B1 5/2008 Yeo et al.
7,372,650 B1 5/2008 Kupferman
7,380,147 B1 5/2008 Sun
7,392,340 B1 6/2008 Dang et al.
7,404,013 B1 7/2008 Masiewicz
7,406,545 B1 7/2008 Rothberg et al.
7,409,498 B2 8/2008 Henning et al.
7,415,571 B1 8/2008 Hanan
7,436,610 B1 10/2008 Thelin
7,437,502 B1 10/2008 Coker
7,440,214 B1 10/2008 Ell et al.
7,451,344 B1 11/2008 Rothberg
7,471,483 B1 12/2008 Ferris et al.
7,471,486 B1 12/2008 Coker et al.
7,486,060 B1 2/2009 Bennett
7,496,493 B1 2/2009 Stevens
7,518,819 B1 4/2009 Yu et al.
7,526,184 B1 4/2009 Parkinen et al.
7,539,924 B1 5/2009 Vasquez et al.
7,543,117 B1 6/2009 Hanan
7,551,383 B1 6/2009 Kupferman
7,562,282 B1 7/2009 Rothberg
7,577,973 B1 8/2009 Kapner, III et al.
7,596,797 B1 9/2009 Kapner, III et al.
7,599,139 B1 10/2009 Bombet et al.
7,619,841 B1 11/2009 Kupferman
7,647,544 B1 1/2010 Masiewicz
7,649,704 B1 1/2010 Bombet et al.
7,653,927 B1 1/2010 Kapner, III et al.
7,656,603 B1 2/2010 Xing
7,656,763 B1 2/2010 Jin et al.
7,657,149 B2 2/2010 Boyle
7,672,072 B1 3/2010 Boyle et al.
7,673,075 B1 3/2010 Masiewicz
7,688,540 B1 3/2010 Mei et al.
7,724,461 B1 5/2010 McFadyen et al.
7,725,584 B1 5/2010 Hanmann et al.
7,730,295 B1 6/2010 Lee
7,760,458 B1 7/2010 Trinh
7,768,776 B1 8/2010 Szeremeta et al.
7,804,657 B1 9/2010 Hogg et al.
7,813,954 B1 10/2010 Price et al.
7,827,320 B1 11/2010 Stevens
7,839,588 B1 11/2010 Dang et al.
7,843,660 B1 11/2010 Yeo
7,852,596 B2 12/2010 Boyle et al.
7,859,782 B1 12/2010 Lee
7,872,822 B1 1/2011 Rothberg
7,898,756 B1 3/2011 Wang
7,898,762 B1 3/2011 Guo et al.
7,900,037 B1 3/2011 Fallone et al.
7,900,125 B1 3/2011 Liu et al.
7,907,364 B2 3/2011 Boyle et al.
7,929,234 B1 4/2011 Boyle et al.
7,933,087 B1 4/2011 Tsai et al.
7,933,090 B1 4/2011 Jung et al.
7,934,030 B1 4/2011 Sargenti, Jr. et al.
7,940,491 B2 5/2011 Szeremeta et al.
7,944,639 B1 5/2011 Wang
7,945,727 B2 5/2011 Rothberg et al.
7,949,564 B1 5/2011 Hughes et al.
7,974,029 B2 7/2011 Tsai et al.
7,974,039 B1 7/2011 Xu et al.
7,982,993 B1 7/2011 Tsai et al.
7,984,200 B1 7/2011 Bombet et al.
7,990,648 B1 8/2011 Wang
7,992,179 B1 8/2011 Kapner, III et al.
8,004,785 B1 8/2011 Tsai et al.
8,006,027 B1 8/2011 Stevens et al.
8,014,094 B1 9/2011 Jin
8,014,977 B1 9/2011 Masiewicz et al.
8,019,914 B1 9/2011 Vasquez et al.
8,040,625 B1 10/2011 Boyle et al.
8,078,943 B1 12/2011 Lee
8,079,045 B2 12/2011 Krapf et al.
8,082,433 B1 12/2011 Fallone et al.
8,085,487 B1 12/2011 Jung et al.
8,089,719 B1 1/2012 Dakroub
8,090,902 B1 1/2012 Bennett et al.
8,090,906 B1 1/2012 Blaha et al.
8,091,112 B1 1/2012 Elliott et al.

(56) References Cited

U.S. PATENT DOCUMENTS

| | | | |
|---|---|---|---|
| 8,094,396 | B1 | 1/2012 | Zhang et al. |
| 8,094,401 | B1 | 1/2012 | Peng et al. |
| 8,116,020 | B1 | 2/2012 | Lee |
| 8,116,025 | B1 | 2/2012 | Chan et al. |
| 8,134,793 | B1 | 3/2012 | Vasquez et al. |
| 8,134,798 | B1 | 3/2012 | Thelin et al. |
| 8,139,301 | B1 | 3/2012 | Li et al. |
| 8,139,310 | B1 | 3/2012 | Hogg |
| 8,144,419 | B1 | 3/2012 | Liu |
| 8,145,452 | B1 | 3/2012 | Masiewicz et al. |
| 8,149,528 | B1 | 4/2012 | Suratman et al. |
| 8,154,812 | B1 | 4/2012 | Boyle et al. |
| 8,159,768 | B1 | 4/2012 | Miyamura |
| 8,161,328 | B1 | 4/2012 | Wilshire |
| 8,164,849 | B1 | 4/2012 | Szeremeta et al. |
| 8,174,780 | B1 | 5/2012 | Tsai et al. |
| 8,190,575 | B1 | 5/2012 | Ong et al. |
| 8,194,338 | B1 | 6/2012 | Zhang |
| 8,194,340 | B1 | 6/2012 | Boyle et al. |
| 8,194,341 | B1 | 6/2012 | Boyle |
| 8,201,066 | B1 | 6/2012 | Wang |
| 8,271,692 | B1 | 9/2012 | Dinh et al. |
| 8,279,550 | B1 | 10/2012 | Hogg |
| 8,281,218 | B1 | 10/2012 | Ybarra et al. |
| 8,285,923 | B2 | 10/2012 | Stevens |
| 8,289,656 | B1 | 10/2012 | Huber |
| 8,305,705 | B1 | 11/2012 | Roohr |
| 8,307,156 | B1 | 11/2012 | Codilian et al. |
| 8,310,775 | B1 | 11/2012 | Boguslawski et al. |
| 8,315,006 | B1 | 11/2012 | Chahwan et al. |
| 8,316,263 | B1 | 11/2012 | Gough et al. |
| 8,320,067 | B1 | 11/2012 | Tsai et al. |
| 8,324,974 | B1 | 12/2012 | Bennett |
| 8,332,695 | B2 | 12/2012 | Dalphy et al. |
| 8,339,919 | B1 | 12/2012 | Lee |
| 8,341,337 | B1 | 12/2012 | Ong et al. |
| 8,350,628 | B1 | 1/2013 | Bennett |
| 8,356,184 | B1 | 1/2013 | Meyer et al. |
| 8,370,683 | B1 | 2/2013 | Ryan et al. |
| 8,375,225 | B1 | 2/2013 | Ybarra |
| 8,375,274 | B1 | 2/2013 | Bonke |
| 8,380,922 | B1 | 2/2013 | DeForest et al. |
| 8,390,948 | B2 | 3/2013 | Hogg |
| 8,390,952 | B1 | 3/2013 | Szeremeta |
| 8,392,689 | B1 | 3/2013 | Lott |
| 8,407,393 | B1 | 3/2013 | Yolar et al. |
| 8,413,010 | B1 | 4/2013 | Vasquez et al. |
| 8,417,566 | B2 | 4/2013 | Price et al. |
| 8,421,663 | B1 | 4/2013 | Bennett |
| 8,422,172 | B1 | 4/2013 | Dakroub et al. |
| 8,427,770 | B1 | 4/2013 | O'Dell et al. |
| 8,427,771 | B1 | 4/2013 | Tsai |
| 8,429,343 | B1 | 4/2013 | Tsai |
| 8,433,937 | B1 | 4/2013 | Wheelock et al. |
| 8,433,977 | B1 | 4/2013 | Vasquez et al. |
| 8,441,909 | B1 | 5/2013 | Thayamballi et al. |
| 8,456,980 | B1 | 6/2013 | Thayamballi |
| 8,458,526 | B2 | 6/2013 | Dalphy et al. |
| 8,462,466 | B2 | 6/2013 | Huber |
| 8,467,151 | B1 | 6/2013 | Huber |
| 8,483,027 | B1 | 7/2013 | Mak et al. |
| 8,489,841 | B1 | 7/2013 | Strecke et al. |
| 8,493,679 | B1 | 7/2013 | Boguslawski et al. |
| 8,499,198 | B1 | 7/2013 | Messenger et al. |
| 8,514,506 | B1 | 8/2013 | Li et al. |
| 8,554,741 | B1 | 10/2013 | Malina |
| 8,560,759 | B1 | 10/2013 | Boyle et al. |
| 8,576,509 | B1 | 11/2013 | Hogg |
| 8,576,511 | B1 | 11/2013 | Coker et al. |
| 8,578,100 | B1 | 11/2013 | Huynh et al. |
| 8,578,242 | B1 | 11/2013 | Burton et al. |
| 8,582,223 | B1 | 11/2013 | Garani et al. |
| 8,582,231 | B1 | 11/2013 | Kermiche et al. |
| 8,589,773 | B1 | 11/2013 | Wang et al. |
| 8,593,753 | B1 | 11/2013 | Anderson |
| 8,599,512 | B2 | 12/2013 | Hogg |
| 8,605,379 | B1 | 12/2013 | Sun |
| 8,611,031 | B1 | 12/2013 | Tan et al. |
| 8,611,032 | B2 | 12/2013 | Champion et al. |
| 8,612,798 | B1 | 12/2013 | Tsai |
| 8,619,383 | B1 | 12/2013 | Jung et al. |
| 8,619,508 | B1 | 12/2013 | Krichevsky et al. |
| 8,619,529 | B1 | 12/2013 | Liew et al. |
| 8,621,115 | B1 | 12/2013 | Bombet et al. |
| 8,621,133 | B1 | 12/2013 | Boyle |
| 8,625,224 | B1 | 1/2014 | Lin et al. |
| 8,625,225 | B1 | 1/2014 | Wang |
| 8,626,463 | B2 | 1/2014 | Stevens et al. |
| 8,630,052 | B1 | 1/2014 | Jung et al. |
| 8,631,188 | B1 | 1/2014 | Heath et al. |
| 8,635,412 | B1 | 1/2014 | Wilshire |
| 8,661,193 | B1 | 2/2014 | Cobos et al. |
| 8,665,547 | B1 | 3/2014 | Yeo et al. |
| 8,667,248 | B1 | 3/2014 | Neppalli |
| 8,670,205 | B1 | 3/2014 | Malina et al. |
| 8,671,250 | B2 | 3/2014 | Lee |
| 8,681,442 | B2 | 3/2014 | Hogg |
| 8,681,445 | B1 | 3/2014 | Kermiche et al. |
| 8,683,295 | B1 | 3/2014 | Syu et al. |
| 8,687,306 | B1 | 4/2014 | Coker et al. |
| 8,687,307 | B1 | 4/2014 | Patton, III |
| 8,687,313 | B2 | 4/2014 | Selvaraj |
| 8,693,133 | B1 | 4/2014 | Lee et al. |
| 8,698,492 | B1 | 4/2014 | Mak et al. |
| 8,699,171 | B1 | 4/2014 | Boyle |
| 8,699,172 | B1 | 4/2014 | Gunderson et al. |
| 8,711,500 | B1 | 4/2014 | Fong et al. |
| 8,711,506 | B1 | 4/2014 | Giovenzana et al. |
| 8,711,665 | B1 | 4/2014 | Abdul Hamid |
| 8,717,694 | B1 | 5/2014 | Liew et al. |
| 8,717,695 | B1 | 5/2014 | Lin et al. |
| 8,730,612 | B1 | 5/2014 | Haralson |
| 8,743,502 | B1 | 6/2014 | Bonke et al. |
| 8,749,911 | B1 | 6/2014 | Sun et al. |
| 8,753,146 | B1 | 6/2014 | Szeremeta et al. |
| 8,755,136 | B1 | 6/2014 | Ng et al. |
| 8,756,361 | B1 | 6/2014 | Carlson et al. |
| 8,760,782 | B1 | 6/2014 | Garani et al. |
| 8,760,792 | B1 | 6/2014 | Tam |
| 8,769,593 | B1 | 7/2014 | Schwartz et al. |
| 8,773,787 | B1 | 7/2014 | Beker |
| 8,773,793 | B1 | 7/2014 | McFadyen |
| 8,773,802 | B1 | 7/2014 | Anderson et al. |
| 8,773,807 | B1 | 7/2014 | Chia et al. |
| 8,773,957 | B1 | 7/2014 | Champion et al. |
| 8,780,470 | B1 | 7/2014 | Wang et al. |
| 8,782,334 | B1 | 7/2014 | Boyle et al. |
| 8,786,976 | B1 | 7/2014 | Kang et al. |
| 8,787,125 | B1 | 7/2014 | Lee |
| 8,792,196 | B1 | 7/2014 | Lee |
| 8,792,200 | B1 | 7/2014 | Tam et al. |
| 8,797,667 | B1 | 8/2014 | Barlow et al. |
| 8,799,977 | B1 | 8/2014 | Kapner, III et al. |
| 8,817,413 | B1 | 8/2014 | Knigge et al. |
| 8,817,584 | B1 | 8/2014 | Selvaraj |
| 8,825,976 | B1 | 9/2014 | Jones |
| 8,825,977 | B1 | 9/2014 | Syu et al. |
| 8,988,802 | B1 * | 3/2015 | Erden et al. .................... 360/39 |
| 9,019,642 | B1 * | 4/2015 | Xia et al. ........................ 360/39 |
| 9,030,769 | B2 * | 5/2015 | Patapoutian .................... 360/31 |
| 2007/0025005 | A1 | 2/2007 | Shimizu |
| 2009/0113702 | A1 | 5/2009 | Hogg |
| 2010/0306551 | A1 | 12/2010 | Meyer et al. |
| 2011/0226729 | A1 | 9/2011 | Hogg |
| 2012/0159042 | A1 | 6/2012 | Lott et al. |
| 2012/0275050 | A1 | 11/2012 | Wilson et al. |
| 2012/0281963 | A1 | 11/2012 | Krapf et al. |
| 2012/0324980 | A1 | 12/2012 | Nguyen et al. |

* cited by examiner

READ FAILOVER METHOD AND APPARATUS FOR A DATA STORAGE SYSTEM

CROSS-REFERENCE TO RELATED APPLICATIONS

This application claims priority to provisional U.S. Patent Application Ser. No. 62/005,796, filed on May 30, 2014, which is hereby incorporated by reference in its entirety.

BACKGROUND

Magnetic storage systems are utilized in a wide variety of devices in both stationary and mobile computing environments. Magnetic storage systems include hard disk drives (HDD), and solid state hybrid drives (SSHD) that combine features of a solid-state drive (SSD) and a hard disk drive (HDD). Examples of devices that incorporate magnetic storage systems include desktop computers, portable notebook computers, portable hard disk drives, servers, network attached storage, digital versatile disc (DVD) players, high definition television receivers, vehicle control systems, cellular or mobile telephones, television set top boxes, digital cameras, digital video cameras, video game consoles, and portable media players.

There is an ongoing effort within the magnetic storage system industry to increase storage capacity while maintaining the same external drive form factor. Track density has increased, and track pitch has decreased, such that magnetic read heads may detect more inter-track noise. Two-dimensional magnetic recording (TDMR) uses multiple read heads to read a single data track, and can improve the reading performance of a magnetic storage system with a high-density disk, as compared to a system using a single read head.

BRIEF DESCRIPTION OF THE DRAWINGS

The foregoing aspects and many of the attendant advantages described herein will become more readily appreciated by reference to the following detailed description, when taken in conjunction with the accompanying drawings, wherein.

DETAILED DESCRIPTION

Figure 1:
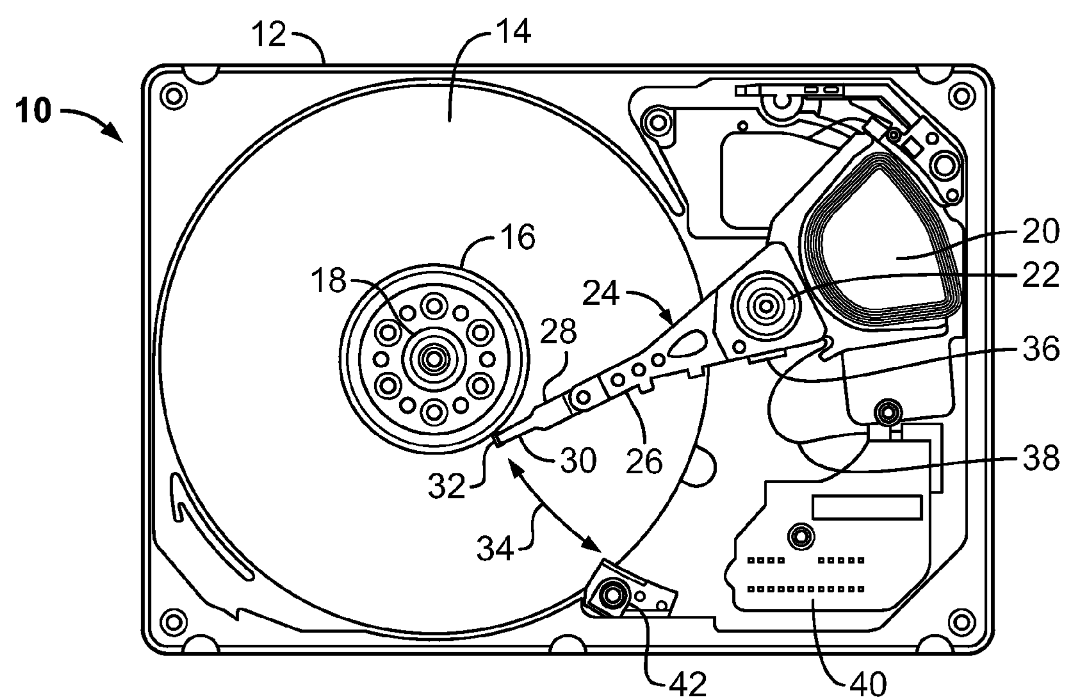
FIG. 1 is a top plan view of a disk drive data storage system in which embodiments are useful.

In the following description, numerous specific details are disclosed to provide a thorough understanding of embodiments of the method, system and apparatus. One skilled in the relevant art will recognize, however, that embodiments of the method, system and apparatus described herein may be practiced without one or more of the specific details, or with other electronic devices, methods, components, and materials, and that various changes and modifications can be made while remaining within the scope of the appended claims. In other instances, well-known electronic devices, components, structures, materials, operations, methods, process steps and the like may not be shown or described in detail to avoid obscuring aspects of the embodiments. Embodiments of the apparatus, method and system are described herein with reference to figures.

Reference throughout this specification to "one embodiment," "an embodiment," or similar language means that a particular feature, structure, electronic device, method or characteristic described in connection with the embodiment is included in at least one embodiment. Thus, appearances of the phrases "in one embodiment," "in an embodiment," and similar language throughout this specification may refer to separate embodiments or may all refer to the same embodiment. Furthermore, the described features, structures, methods, electronic devices, or characteristics may be combined in any suitable manner in one or more embodiments.

Magnetic storage system performance demands and design needs have intensified. The current demand for larger capacity in a smaller dimension is linked to the demand for ever increasing storage track density. As the density of data on a magnetic storage medium increases, the strength of the magnetic fields generally decrease, in order to minimize interference. With an increase in track density and decrease in track pitch, magnetic read heads may detect more inter-track noise. Two-dimensional magnetic recording (TDMR) can improve the reading performance of a magnetic storage system with a high-density disk, as compared to a system using a single read head. TDMR read heads counteract extraneous noise by using multiple read elements to read a single data track, and as such, help to create a better signal to noise ratio (SNR) during read back. Additionally, using TDMR, two or more tracks may be detected simultaneously.

However, with a conventional TDMR system with multiple read elements, or a single reader system, an entire media surface may be lost when a reader element fails. Reader element failure may occur for a wide variety of reasons, including being exposed to damaging environmental conditions. As an example, one reader element situated on the same head as a second reader element may react differently to particular temperature and humidity, causing failure or substandard performance of one reader element but proper performance by the second reader element on the same head.

A reader failover apparatus, system and method are described herein for a data storage system. Embodiments detect when a first reader system provides less than a predetermined performance or fails. Thereafter, embodiments cause a second reader system, but not the first reader system, to read the magnetic storage medium. A head includes both the first reader element and the second reader element. When the first reader system is determined to properly operate at a predetermined performance, both the first reader system and the second reader system are together utilized to read the magnetic storage medium. In an alternative embodiment, the second reader system is only employed in lieu of the first reader system, when the first reader system is determined to provide less than a predetermined performance or fails.

At least two reader systems are employed to read the magnetic storage medium. In an embodiment, a buffer stores a signal from a first reader element until control circuitry detects whether or not the first reader element provides less than a predetermined performance or fails. In an embodiment, if the first reader element provides less than a predetermined performance or fails, a second reader element, situated on the same head as the first reader element, performs data storage device functions (e.g., data recovery), improving the robustness of a data storage system.

In an embodiment, the methods and apparatus are utilized with a TDMR head. A conventional TDMR drive system selects specific reader elements for normal operation as a function of armature skew angle, servo performance, etc. Reader element selection may also be based on format/error correction capability as determined during drive manufacturing. These functions may be utilized in part by some embodiments described herein.

In an embodiment, all of, or a majority of, magnetic recording media continues to be readable when a reader element fails, as compared to a conventional single reader system or a conventional TDMR system where at least some recording media is not readable when a reader element fails.

The apparatus, system and methods disclosed may be utilized, in an embodiment, with disk drive memory systems, and other memory systems utilizing a magnetic reading device, including a HDD and a SSHD.

Referring to the figures wherein identical reference numerals denote the same elements throughout the various views, FIG. 1 illustrates a disk drive storage system 10, in which embodiments are useful. Features of the discussion and claims are not limited to this particular design, which is shown only for purposes of the example.

Disk drive 10 includes one or more data storage disks 14 of computer-readable data storage media. Typically, both of the major surfaces of each data storage disk 14 include a plurality of concentrically disposed tracks for data storage purposes, including user data sectors and servo sectors. Each data storage disk 14 is mounted on a hub or spindle 16, which in turn is rotatably interconnected with a base plate 12 and/or cover. Multiple data storage disks 14 are typically mounted in vertically spaced and parallel relation on the spindle 16. A spindle motor 18 rotates the data storage disks 14 at an appropriate rate.

The disk drive 10 also includes an actuator arm assembly 24 that pivots about a pivot bearing 22, which in turn is rotatably supported by the base plate 12 and/or cover. The actuator arm assembly 24 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 14 of the disk drive 10. Other types of actuator arm assembly configurations may be utilized as well, such as an assembly having one or more rigid actuator arm tips or the like that cantilever from a common structure. Movement of the actuator arm assembly 24 is provided by an actuator arm drive assembly, such as a voice coil motor 20 or the like. The voice coil motor (VCM) 20 is a magnetic assembly that controls the operation of the actuator arm assembly 24 under the direction of control electronics 40.

A suspension 28 is attached to the free end of each actuator arm 26 and cantilevers therefrom. The slider 30 is disposed at or near the free end of each suspension 28. What is commonly referred to as the read/write head (e.g., transducer) is mounted as a head unit 32 under the slider 30 and is used in disk drive read/write operations. As the suspension 28 moves, the slider 30 moves along arc path 34 and across the corresponding data storage disk 14 to position the head unit 32 at a selected position on the data storage disk 14 for the disk drive read/write operations. When the disk drive 10 is not in operation, the actuator arm assembly 24 may be pivoted to a parked position utilizing ramp assembly 42. The head unit 32 is connected to a preamplifier 36 via head wires routed along the actuator arm 26, which is interconnected with the control electronics 40 of the disk drive 10 by a flex cable 38 that is typically mounted on the actuator arm assembly 24. Signals are exchanged between the head unit 32 and its corresponding data storage disk 14 for disk drive read/write operations.

The data storage disks 14 comprise a plurality of embedded servo sectors each comprising coarse head position information, such as a track address, and fine head position information, such as servo bursts. As the head 32 passes over each servo sector, a read/write channel (or servo control system) processes the read signal emanating from the head to demodulate the position information. The control circuitry processes the position information to generate a control signal applied to the VCM 20. The VCM 20 rotates the actuator arm 26 in order to position the head over a target track during the seek operation, and maintains the head over the target track during a tracking operation.

The head unit 32 may utilize various types of read sensor technologies such as anisotropic magnetoresistive (AMR), giant magnetoresistive (GMR), tunneling magnetoresistive (TMR), other magnetoresistive technologies, or other suitable technologies.

Figure 2:
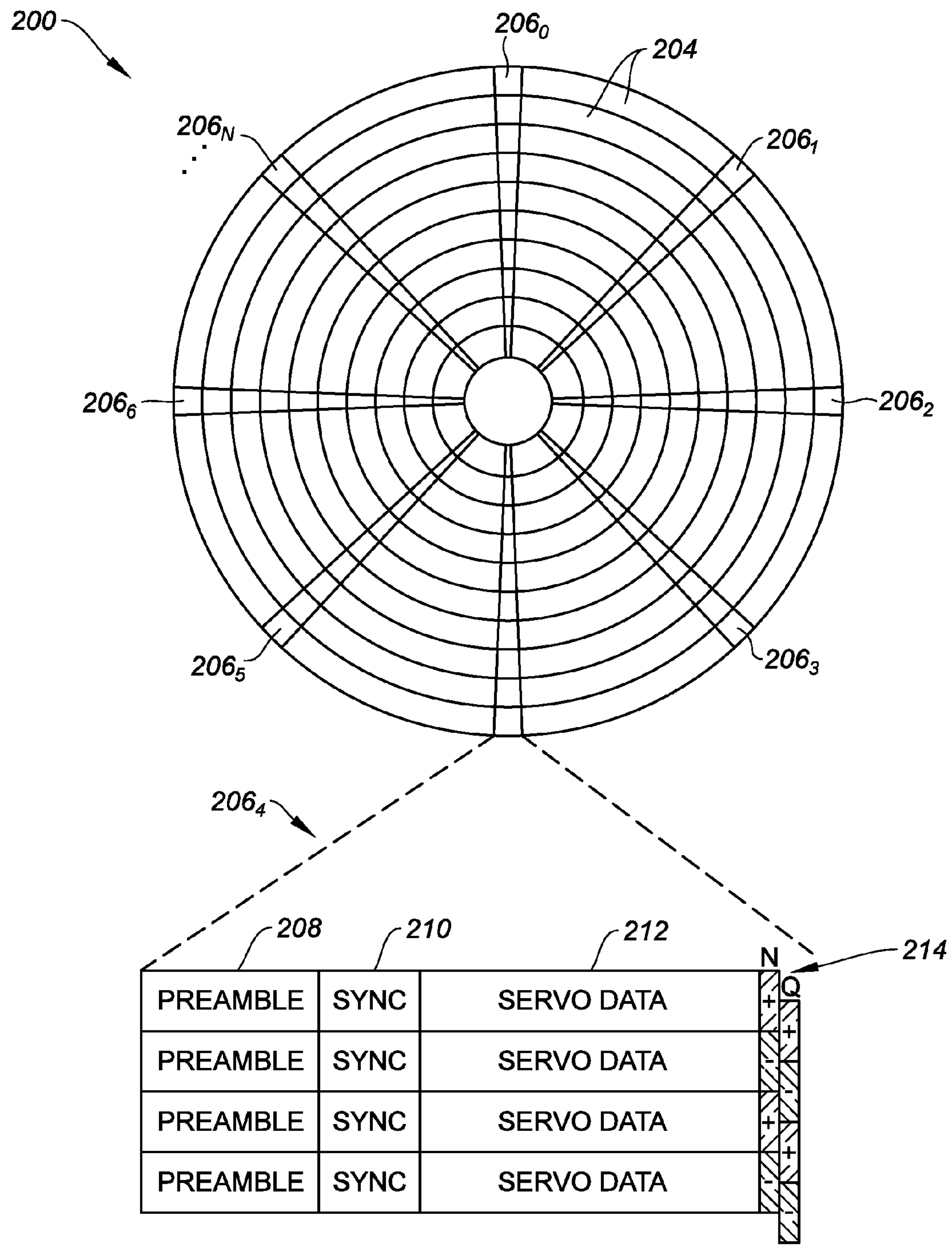
FIG. 2 is a top plan view of a data storage disk, showing servo tracks and servo sectors.

FIG. 2 shows a conventional disk format 200 including a number of servo tracks 204 defined by servo sectors $\mathbf{206}_0$-$\mathbf{206}_N$ recorded around the circumference of each servo track. Each servo sector 206, includes a preamble 208 for storing a periodic pattern, which allows proper gain adjustment and timing synchronization of the read signal, and a sync mark 210 for storing a special pattern used to symbol synchronize to a servo data field 212. The servo data field 212 stores coarse head positioning information, such as a servo track address, used to position the head over a target data track during a seek operation. Each servo sector 206, further includes groups of servo bursts 214 (e.g., N and Q servo bursts), which are recorded with a predetermined phase relative to one another and relative to the servo track centerlines. The phase based servo bursts 214 provide fine head position information used for centerline tracking while accessing a data track during write/read operations. A position error signal (PES) is generated by reading the servo bursts 214, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Figure 3:
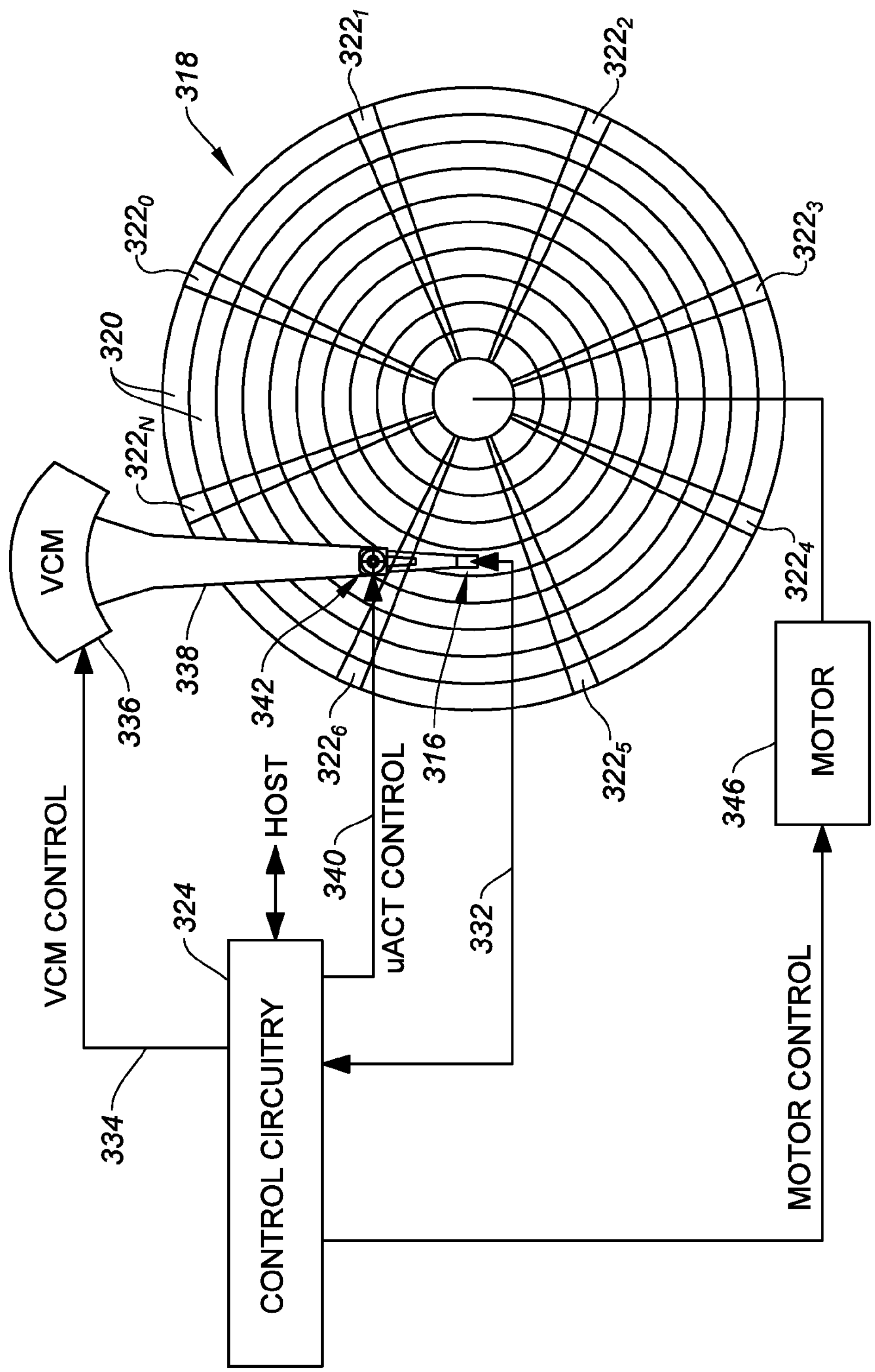
FIG. 3 is a top plan view of a hard disk drive (HDD) including a head and a disk including servo tracks, servo sectors, and control circuitry operable to actuate the head over the disk, in an embodiment.

Referring to FIG. 3, a portion of hard disk drive (HDD) is illustrated, according to an embodiment, including a head 316 and a disk 318. The disk 318 includes a plurality of servo tracks 320, wherein each servo track includes a plurality of servo sectors $\mathbf{322}_0$-$\mathbf{322}_N$. The disk drive further includes control circuitry 324 including a servo control system operable to actuate the head over the disk in response to the servo sectors $\mathbf{322}_0$-$\mathbf{322}_N$. The disk is rotated by a spindle motor 346 at a rotational speed that is controlled by the control circuitry 324, for example, a motor driver of the control circuitry 324.

Control circuitry 324 processes a read signal 332 emanating from the head 316 to demodulate the servo sectors $\mathbf{322}_0$-$\mathbf{322}_N$ and generate a position error signal (PES) representing an error between the actual position of the head and a target position relative to a target track. In an embodiment, the target track includes a target data track defined relative to the servo tracks 320, wherein the data tracks may be recorded at the same or different radial density than the servo tracks 320. The control circuitry 324 filters the PES using a suitable compensation filter to generate a control signal 334 applied to a voice coil motor (VCM) 336, which rotates an actuator arm 338 about a pivot in order to actuate the head 316 radially over the disk 318 in a direction that reduces the PES. The control circuitry 324 may also generate a control signal 340 applied to a microactuator 342 in order to actuate the head 316 over the disk 318 in fine movements. Any suitable microactuator 342 may be employed in the embodiments, such as a piezoelectric actuator. In addition, the microactuator 342 may actuate the head 316 over the disk 318 in any suitable manner, such as by actuating a suspension relative to the actuator arm, or actuating a slider relative to the suspension. The servo sectors $322_0$-$322_N$ may include any suitable head position information, such as a track address for coarse positioning and servo bursts for fine positioning. The servo bursts may include any suitable pattern, such as an amplitude based servo pattern or a phase based servo pattern.

To accomplish reading and writing of data to and from the disk, the control circuitry may include a read channel configured to process the read signal 332 from the head 316 and a write channel to prepare write signal 332 for sending to the head 316 for writing.

In an embodiment, head 316 is a TDMR head with multiple reader elements, allowing extraction of multiple read signals and subsequently improved SNR gains via signal processing the signal from multiple reader elements. The reader elements read the same track or adjacent tracks. In an embodiment, TDMR gains are provided when reading mostly the same track or processing signal from a main track and its adjacent tracks. In an embodiment, head 316 is a TDMR head that may be used with tracks including spiral data tracks, as well as conventional concentric data tracks.

In an embodiment, there is a separation between the individual reader elements, which can vary greatly over process, for each head. For a TDMR data or servo operation, the separation of the reader elements is situated for optimal digital signal processing (DSP) of the signals from the different reader elements. In an embodiment, the reader element separation is measured with high precision at different locations on the disk (e.g., adjusting for different actuator positions). In an embodiment, the TDMR head increases the data density of the recording media. In an embodiment, two reader elements, while accessing a target track, are separated and offset from a position centerline of the target track. In an embodiment, when the second reader system, but not the first reader system, is caused to read the magnetic storage medium, then the second reader system head is repositioned to a position that is centerline to a target track.

Figure 4:
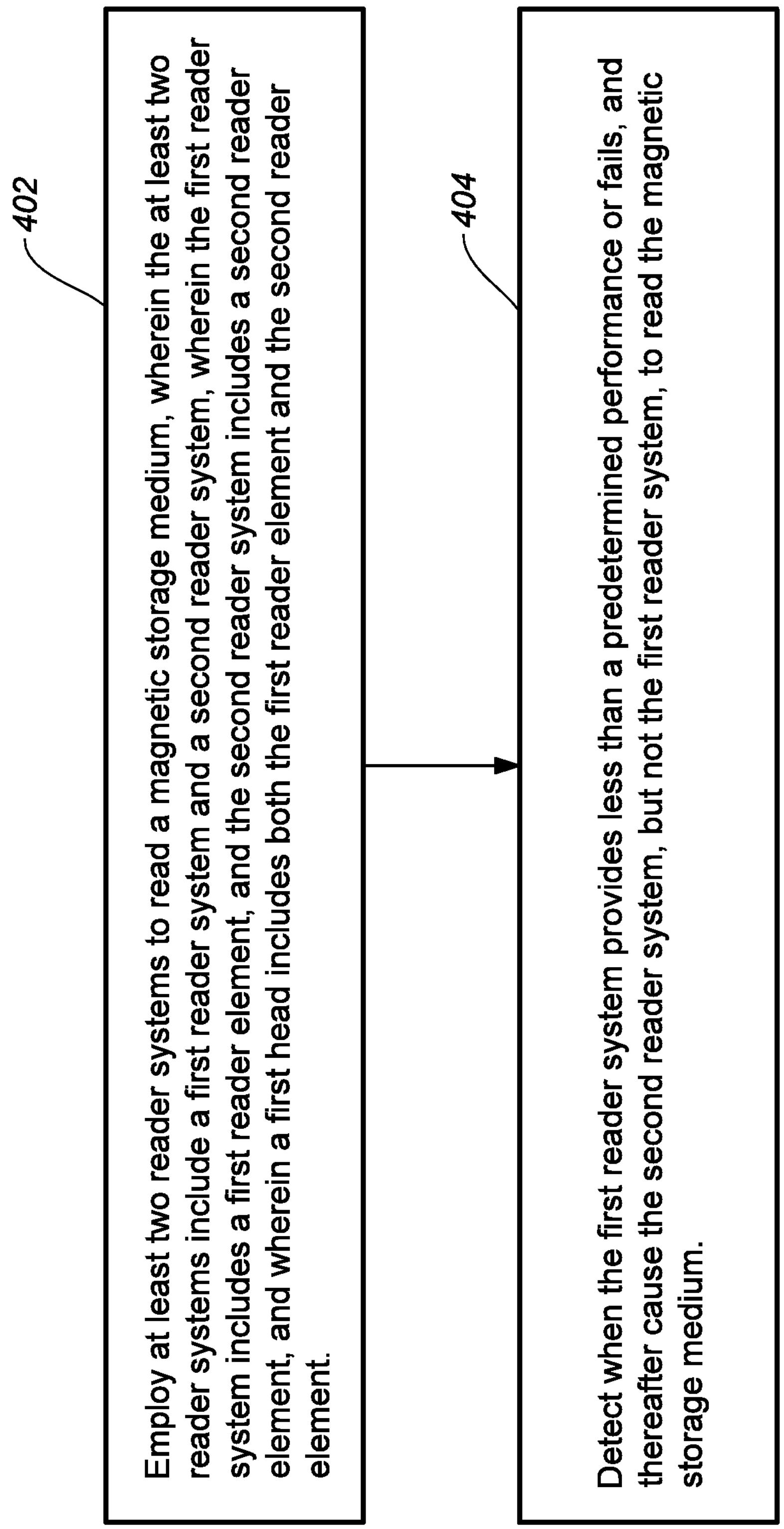
FIG. 4 is a flow diagram illustrating a reader failover system and method for a data storage system, in an embodiment.

FIG. 4 illustrates a reader failover method and process for a data storage device. It will be understood that each step in the flowchart illustration can be implemented by computer program instructions. These computer program instructions may be provided to a processor of a programmable data processing apparatus, such that the instructions execute via the processor to implement the functions or actions specified in the flowchart. The instructions may be executed by a controller. In an embodiment, the controller is a component of a data storage device, such as a disk drive storage system. In an alternative embodiment, the controller is separate from the data storage device and may be connected to the data storage device to externally monitor and communicate with the data storage device.

In an embodiment, as detailed in step 402, at least two reader systems are employed to read a magnetic storage medium. The reader systems include a first reader system and a second reader system. The first reader system includes a first reader element, and the second reader system includes a second reader element. A first head includes both the first reader element and the second reader element.

Next, as stated in step 404, the method further includes detecting when the first reader system provides less than a predetermined performance or fails. Thereafter, the method includes causing the second reader system, but not the first reader system, to read the magnetic storage medium.

In an embodiment, before there is a detection that the first reader system provides less than a predetermined performance or fails, the first reader system and the second reader system are utilized together to read the magnetic storage medium. In an alternative embodiment, the second reader system is only employed in lieu of the first reader system, when the first reader system is determined to provide less than a predetermined performance or fails.

In an embodiment, the failover method and system includes directing components of a TDMR drive such as servo, data channel, and controller firmware in the event that a reader system provides less than a predetermined performance or fails. For example, a data storage device firmware may have a contingency code that is activated upon detection of a reader system failure. In an embodiment, pre-defined normal and failure mode parameters/configuration values (e.g. related to channel, servo, etc.) may be stored in a lookup table (e.g., stored in non-volatile memory). In an embodiment, the memory may also be a disk media, with parameters read off of the reserve tracks at drive power up and stored in the system DDR buffer memory during operation of the hard drive. If failure mode is initiated the appropriate table values are used. Once the failover method is employed, the properly performing reader element(s) are employed. In an embodiment, if a reader system is determined to provide less than a predetermined performance, it may be used for a limited purpose.

Figure 5:
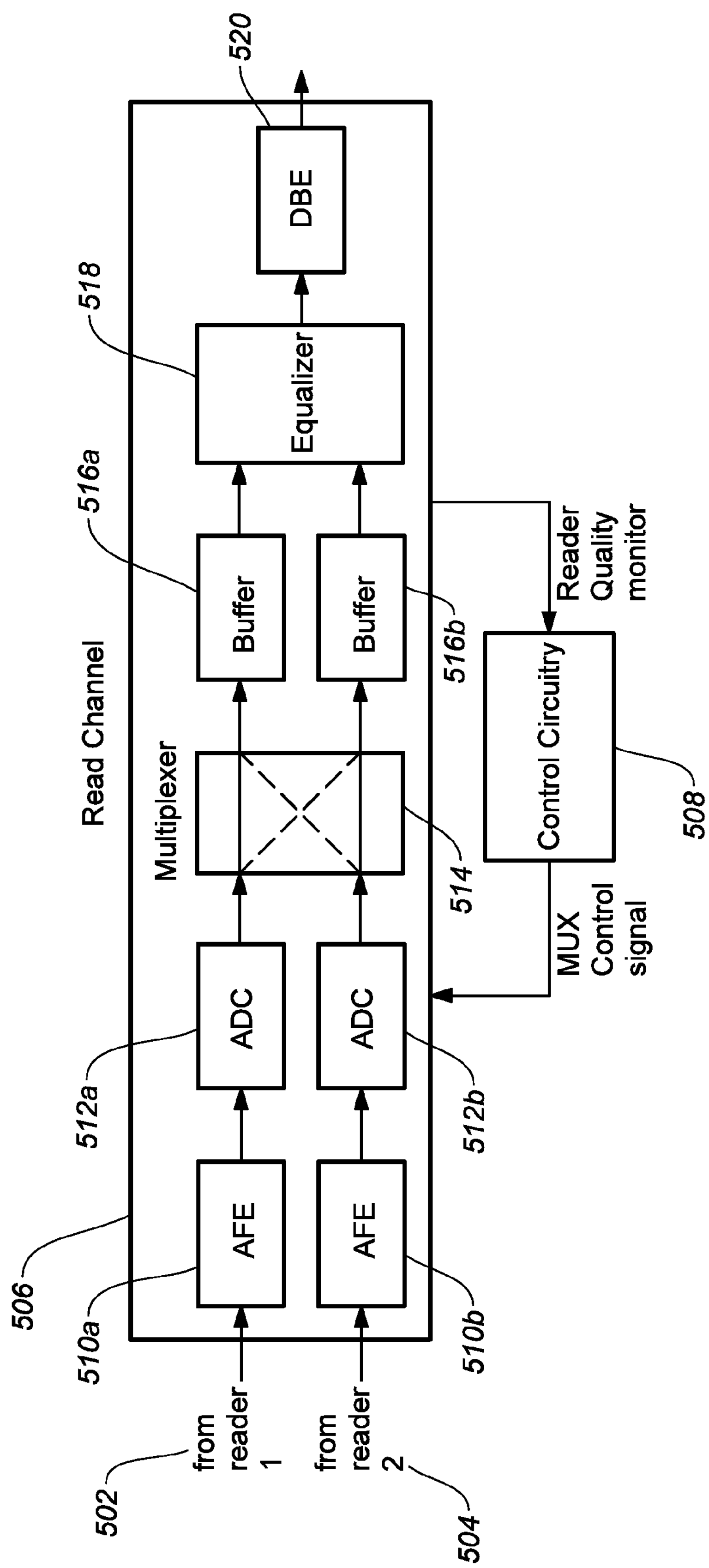
FIG. 5 is a schematic representation of a reader failover apparatus including a read channel with two reader element inputs, and control circuitry, as can be used in a data storage system as in FIG. 1, in an embodiment.

FIG. 5 shows an embodiment of a read channel 506, and control circuitry 508 that monitors the performance of reader elements 502 and 504 for a data storage device. Signals from the two reader elements 502 and 504 (marked reader 1 and reader 2) are acquired in parallel to decode user data. In this example, inputs from two reader elements on one head are shown in the reader array. In an alternative embodiment, more than two reader elements on one head may be utilized to read a magnetic storage medium, and signals from multiple reader elements may input to a read channel and control circuitry. In an embodiment, the head that includes reader elements 502 and 504 is a two-dimensional magnetic recording (TDMR) head.

Any suitable control circuitry may be employed to implement the methods described herein, such as any suitable integrated circuit or circuits. For example, the control circuitry may be implemented within a read channel integrated circuit, or in a component separate from the read channel, such as a disk controller, or certain operations described herein may be performed by a read channel and others by a disk controller. In an embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In embodiment, the control circuitry includes suitable logic circuitry, such as state machine circuitry.

In an embodiment, the control circuitry or DSP includes a microprocessor executing instructions, the instructions being operable to cause the microprocessor to perform the methods described herein. The instructions may be stored in any computer-readable medium. In an embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on.

Reader element 502 is a portion of reader system 1. Reader system 1 further includes analog front end 510*a*, first analog-to-digital converter 512*a*, multiplexer 514, buffer 516*a*, equalizer 518, and digital back end 520.

Reader element 504 is a portion of reader system 2. Reader system 2 further includes analog front end 510*b*, first analog-to-digital converter 512*b*, multiplexer 514, buffer 516*b*, equalizer 518, and digital back end 520.

In an embodiment, control circuitry 508 detects when the reader system 1 provides less than a predetermined performance or fails, and thereafter causes reader system 2, but not reader system 1, to read the magnetic storage medium. In an embodiment, the control circuitry includes a controller and/or firmware. In an embodiment, one or more reader quality metrics (e.g., SNR of a signal) are detected by the control circuitry 508. In an embodiment, in-line calibrations may detect that a read element provides less than a predetermined performance or fails, despite failed sectors not being detected. In an embodiment, control circuitry 508 sets the data storage device to a data recovery mode when the reader system 1 provides less than the predetermined performance or fails. An alert is generated when the data storage device is set to the data recovery mode, and reader system 2 is directed to recover data from the magnetic storage medium.

In an embodiment, the data storage device initially attempts to recover storage medium data via conventional error recovery methods, but when the conventional error recovery methods fail to fully recover data, the methods of an embodiment are utilized. Further, in an embodiment, when reader system 1 and reader system 2 are both determined to provide less than a predetermined performance, then the control circuitry determines which reader system provides the better quality signal, and the reader system providing the better quality signal is utilized to read the magnetic storage medium.

In an embodiment, when reader element 502 is determined to provide less than a predetermined performance or fails, the offset of reader element 504 during the signal acquisition by reader element 504 is governed by optimization before deployment, and/or by operational constraints (e.g., ability to obtain timing information).

In an embodiment, when a signal is created via reader element 502, the reader system 1 passes the reader element 502 signal from reader element 502 to a preamplifier, to analog front end 506*a*, to analog-to-digital converter 512*a*, to multiplexer 514, to buffer 516*a*, to equalizer 518, and to digital back end 520.

In an embodiment, when a signal is created via reader element 504, the reader system 2 passes the reader element 504 signal from reader element 504 to a preamplifier, to analog front end 506*b*, to analog-to-digital converter 512*b*, to multiplexer 514, to buffer 516*b*, to equalizer 518, and to digital back end 520.

In an embodiment, when a signal from reader element 502 is created, the reader system 1 passes the reader element signal 502 from the reader element 502 to read channel 506, and from read channel 506 to controller 508. When a signal from reader element 504 is created, the reader system 2 passes the reader element signal 504 from the reader element 504 to read channel 506, and from read channel 506 to controller 508.

In an embodiment, the multiple reader element signals on one head input to one read channel. In an alternative embodiment, the multiple reader element signals input to separate read channels. In yet another embodiment, the multiple reader element signal pathways utilize portions of the same read channel, as well as utilize separate circuitry.

In an embodiment, buffer 516*a* stores the signal from reader element 502 until the control circuitry 508 detects whether or not reader system 1 provides less than the predetermined performance or fails.

In an embodiment, multiplexer 514 routes outputs from analog-to-digital converters 512*a* and 512*b*, to buffers 516*a* and 516*b*, storing any signal with a buffer when a signal is determined to provide less than the predetermined performance.

In an embodiment, a signal from reader system 2 is not utilized by the data storage device until reader system 1 provides less than the predetermined performance or fails.

In an embodiment, when there is a detection by control circuitry 508 that the first reader system provides less than a predetermined performance or fails, all of, or a portion of, reader system 1 is not utilized to read the magnetic storage medium. For example, when only one portion of reader system 1 fails (e.g., analog-to-digital converter 512*a*), reader system 1 may continue to use the functioning portion of reader system 1, and alternatively use a portion of reader system 2 (e.g., analog-to-digital converter 512*b*) to read the magnetic storage medium.

Similarly, in an embodiment, when reader system 2 is caused to read the magnetic storage medium, reader system 2 may utilize one portion or more than one portion of reader system 2 to read the magnetic storage medium.

In an embodiment, a third reader element is included with the head that includes reader elements 502 and 504. When control circuitry 508 detects that the third reader system provides less than a predetermined performance or fails, reader system 2, but not reader system 1 or the third reader element (including, e.g., a third reader system) is caused to read the magnetic storage medium.

In an embodiment, the data storage device detects being situated in a predetermined environmental condition, and proactively causes the second reader system, but not the first reader system, to read the magnetic storage medium. This failover method may be executed upon a determination of a likely prospective or predicted reader system failure. In an example, reader element circuits may be situated differently on a wafer, and may have different behavior. Due to the specific usage and calibration for the head, the reader elements may react differently to temperature and humidity. In an embodiment, a reader element may be temporarily disabled due to a predetermined environmental condition, and activated again later when the data storage device is not situated in the predetermined environmental condition.

Embodiments may be used in lieu of full reconstruction in redundant array of independent disks (RAID), thereby reducing the bandwidth and time required for data recovery.

Figure 6:
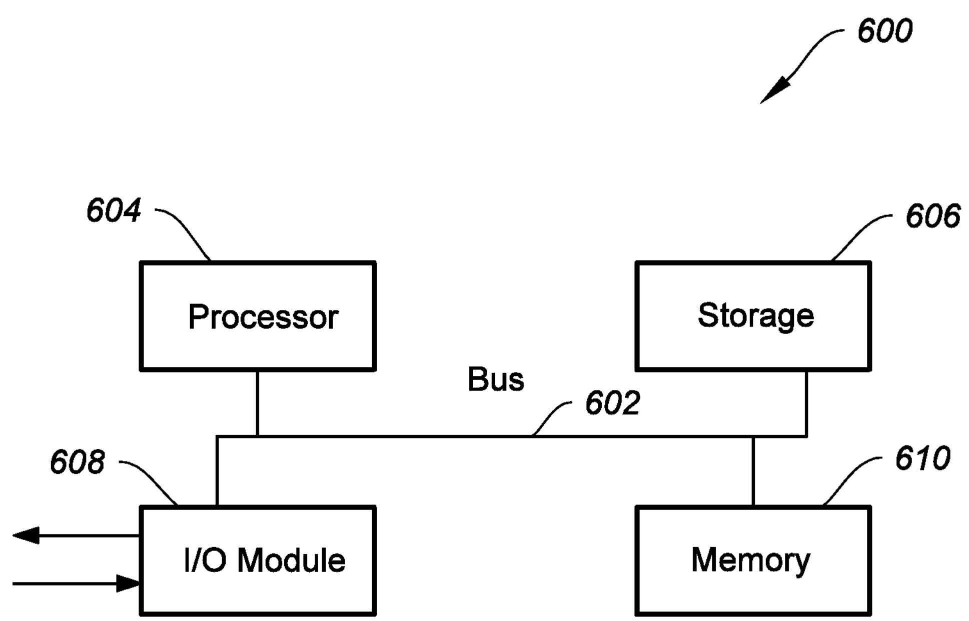
FIG. 6 is a sectional view representation illustrating components of a system that executes methods of an embodiment.

Turning now to FIG. 6, components of system 600 are illustrated, in an embodiment. System 600 includes processor module 604, storage module 606, input/output (I/O) module 608, memory module 610, and bus 602. Although system 600 is illustrated with these modules, other suitable arrangements (e.g., having more or less modules) known to those of ordinary skill in the art may be used. For example, system 600 may be a logic implemented state machine or a programmable logic controller.

In an embodiment, the methods described herein are executed by system 600. Specifically, processor module 604 executes one or more sequences of instructions contained in memory module 610 and/or storage module 606. In one example, instructions may be read into memory module 610 from another machine-readable medium, such as storage module 606. In another example, instructions may be read directly into memory module 610 from I/O module 608, for example from an operator via a user interface. Information may be communicated from processor module 604 to memory module 610 and/or storage module 606 via bus 602 for storage. In an example, the information may be communicated from processor module 304, memory module 610, and/or storage module 606 to I/O module 608 via bus 602. The information may then be communicated from I/O module 608 to an operator via the user interface.

Memory module 610 may be random access memory or other dynamic storage device for storing information and instructions to be executed by processor module 604. In an example, memory module 610 and storage module 606 are both a machine-readable medium.

In an embodiment, processor module 604 includes one or more processors in a multi-processing arrangement, where each processor may perform different functions or execute different instructions and/or processes contained in memory module 610 and/or storage module 606. For example, one or more processors may execute instructions for detecting read element performance, and one or more processors may execute instructions for input/output functions. Also, hard-wired circuitry may be used in place of or in combination with software instructions to implement various example embodiments. Thus, embodiments are not limited to any specific combination of hardware circuitry and software.

The term "circuit" or "circuitry" as used herein includes all levels of available integration, for example, from discrete logic circuits to the highest level of circuit integration such as VLSI, and includes programmable logic components programmed to perform the functions of embodiments as well as general-purpose or special-purpose processors programmed with instructions to perform those functions.

Bus 602 may be any suitable communication mechanism for communicating information. Processor module 604, storage module 606, I/O module 608, and memory module 610 are coupled with bus 602 for communicating information between any of the modules of system 600 and/or information between any module of system 600 and a device external to system 600. For example, information communicated between any of the modules of system 600 may include instructions and/or data.

The term "machine-readable medium" as used herein, refers to any medium that participates in providing instructions to processor module 304 for execution. Such a medium may take many forms, including, but not limited to, non-volatile media, and volatile media. Non-volatile media includes, for example, optical or magnetic disks, such as storage module 306. Volatile media includes dynamic memory, such as memory module 310. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

In an embodiment, a non-transitory machine-readable medium is employed including executable instructions for a data storage device. The instructions include code for detecting when a first reader system provides less than a predetermined performance or fails, and thereafter causing a second reader system, but not the first reader system, to read the magnetic storage medium. In this embodiment, the data storage device employs at least two reader systems to read the magnetic storage medium. The at least two reader systems include the first reader system and the second reader system, wherein the first reader system includes a first reader element, and the second reader system includes a second reader element. A first head includes both the first reader element and the second reader element. In an embodiment, the first head is a two-dimensional magnetic recording (TDMR) head.

In an embodiment, the non-transitory machine-readable medium further includes executable instructions for storing the first reader element signal until detecting whether or not the first reader system provides less than the predetermined performance or fails.

In an embodiment, the non-transitory machine-readable medium further includes executable instructions for setting the data storage device to a data recovery mode when the first reader system provides less than a predetermined performance or fails; providing an alert when the data storage device is set to a data recovery mode; and utilizing the second reader system to recover data.

The various features and processes described herein may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

Modifications and variations may be made to the disclosed embodiments while remaining within the spirit and scope of the methods, systems and apparatus. The implementations described above and other implementations are within the scope of the following claims.

What is claimed is:

1. An apparatus for a data storage device comprising:

at least a first reader system and a second reader system to read a magnetic storage medium, wherein the first reader system includes a first reader element, and the second reader system includes a second reader element, and wherein a first head includes both the first reader element and the second reader element;

control circuitry to detect when the first reader system provides less than a predetermined performance or fails, and thereafter to cause the second reader system, but not the first reader system, to read the magnetic storage medium; and the control circuitry to further detect when a third reader system provides less than the predetermined performance or is nonfunctioning, and thereafter to cause the second reader system, but not the third reader system, to read the magnetic storage medium, wherein the third reader system includes a third reader element, and wherein the first head further includes the third reader element.

2. The apparatus of claim 1, wherein the first head is a two-dimensional magnetic recording (TDMR) head.

3. The apparatus of claim 1, wherein the control circuitry:

sets the data storage device to a data recovery mode when the first reader system provides less than the predetermined performance or fails;

provides an alert when the data storage device is set to the data recovery mode; and directs the second reader system to recover data from the magnetic storage medium.

4. The apparatus of claim 1, wherein:

when a first reader element signal is created, the first reader system passes the first reader element signal from the first reader element to a first read channel, and from the first read channel to the control circuitry; and when a second reader element signal is created, the second reader system passes the second reader element signal from the second reader element to a second read channel, and from the second read channel to the control circuitry.

5. The apparatus of claim 1, wherein when a first reader element signal is created, the first reader system passes the first reader element signal from the first reader element to a first preamplifier, to a first analog front end, to a first analog-to-digital converter, to a multiplexer, to a first buffer, to an equalizer, and to a digital back end;

wherein a first read channel includes the first analog front end, the first analog-to-digital converter, the multiplexer, the first buffer, the equalizer, and the digital back end;

wherein when a second reader element signal is created, the second reader system passes the second reader element signal from the second reader element to a second preamplifier, to a second analog front end, to a second analog-to-digital converter, to the multiplexer, to a second buffer, to the equalizer, and to the digital back end; and wherein a second read channel includes the second analog front end, the second analog-to-digital converter, the multiplexer, the second buffer, the equalizer, and the digital back end.

6. The apparatus of claim 5, wherein the first buffer stores the first reader element signal until the control circuitry detects whether or not the first reader system provides less than the predetermined performance or fails.

7. A method for a data storage device, comprising:

employing at least a first reader system and a second reader system to read a magnetic storage medium, wherein the first reader system includes a first reader element, and the second reader system includes a second reader element, and wherein a first head includes both the first reader element and the second reader element;

detecting when the first reader system provides less than a predetermined performance or fails, and thereafter causing the second reader system, but not the first reader system, to read the magnetic storage medium; and detecting when a third reader system provides less than the predetermined performance or is nonfunctioning, and thereafter causing the second reader system, but not the third reader system, to read the magnetic storage medium, wherein the third reader system includes a third reader element, and wherein the first head further includes the third reader element.

8. The method of claim 7, further comprising not utilizing a signal from the second reader system by the data storage device until the first reader system provides less than the predetermined performance or fails.

9. The method of claim 7, wherein the first head is a two-dimensional magnetic recording (TDMR) head.

10. The method of claim 7, wherein:

causing the second reader system to read the magnetic storage medium comprises utilizing one portion or more than one portion of the second reader system to read the magnetic storage medium; and causing the first reader system to not read the magnetic storage medium comprises not utilizing one portion or more than one portion of the first reader system.

11. The method of claim 7, further comprising utilizing a controller to detect when the first reader system provides less than the predetermined performance or fails, and thereafter to cause the second reader system, but not the first reader system, to read the magnetic storage medium.

12. The method of claim 11, wherein:

when a first reader element signal is created, the first reader system passes the first reader element signal from the first reader element to a first read channel, and from the first read channel to the controller; and when a second reader element signal is created, the second reader system passes the second reader element signal from the second reader element to a second read channel, and from the second read channel to the controller.

13. The method of claim 11, further comprising storing the first reader element signal, utilizing a buffer, until the controller detects whether or not the first reader system provides less than the predetermined performance or fails.

14. The method of claim 7, further comprising setting the data storage device to a data recovery mode when the first reader system provides less than a predetermined performance or fails, providing an alert when the data storage device is set to a data recovery mode, and utilizing the second reader system to recover data.

15. The method of claim 7, further comprising:

detecting that the data storage device is situated in a predetermined environmental condition; and causing the second reader system, but not the first reader system, to read the magnetic storage medium.

16. A non-transitory machine-readable medium including executable instructions for a data storage device, the instructions comprising code for:

employing at least a first reader system and a second reader system to read a magnetic storage medium, wherein the first reader system includes a first reader element, and the second reader system includes a second reader element, and wherein a first head includes both the first reader element and the second reader element;

detecting when the first reader system provides less than a predetermined performance or fails, and thereafter causing the second reader system, but not the first reader system, to read the magnetic storage medium; and detecting when a third reader system provides less than the predetermined performance or is nonfunctioning, and thereafter causing the second reader system, but not the third reader system, to read the magnetic storage medium, wherein the third reader system includes a third reader element, and wherein the first head further includes the third reader element.

17. The non-transitory machine-readable medium of claim 16, wherein the first head is a two-dimensional magnetic recording (TDMR) head.

18. The non-transitory machine-readable medium of claim 16, further comprising storing the first reader element signal until detecting whether or not the first reader system provides less than the predetermined performance or fails.

19. The non-transitory machine-readable medium of claim 16, further comprising setting the data storage device to a data recovery mode when the first reader system provides less than a predetermined performance or fails, providing an alert when the data storage device is set to a data recovery mode, and utilizing the second reader system to recover data.

20. A method for a data storage device, comprising:

employing at least two reader systems to read a magnetic storage medium, wherein the at least two reader systems include a first reader system and a second reader system, wherein the first reader system includes a first reader element, and the second reader system includes a second reader element, and wherein a first head includes both the first reader element and the second reader element; and detecting when the first reader system provides less than a predetermined performance or fails, due to a factor that is independent from concurrent use of the first reader system and the second reader system, and thereafter causing the second reader system, but not the first reader system, to read the magnetic storage medium.

21. The method of claim 20, further comprising setting the data storage device to a data recovery mode when the first reader system provides less than a predetermined performance or fails, providing an alert when the data storage device is set to a data recovery mode, and utilizing the second reader system to recover data.

22. The method of claim 20, further comprising determining whether a portion of the first reader system provides less than a predetermined performance or fails, and utilizing a functioning portion of the first reader system.

* * * * *